(12) United States Patent
Barke et al.

(10) Patent No.: US 10,173,693 B2
(45) Date of Patent: Jan. 8, 2019

(54) METHOD FOR OPERATING A MOTOR VEHICLE AND ASSOCIATED MOTOR VEHICLE

(71) Applicant: Audi AG, Ingolstadt (DE)

(72) Inventors: Alexander Barke, Ingolstadt (DE); Christian Niemeier, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 15/557,954

(22) PCT Filed: Mar. 11, 2016

(86) PCT No.: PCT/EP2016/000437
§ 371 (c)(1),
(2) Date: Sep. 13, 2017

(87) PCT Pub. No.: WO2016/146247
PCT Pub. Date: Sep. 22, 2016

(65) Prior Publication Data
US 2018/0057015 A1   Mar. 1, 2018

(30) Foreign Application Priority Data

Mar. 14, 2015 (DE) ........................ 10 2015 003 348

(51) Int. Cl.
*B60W 50/08* (2012.01)
*B60W 50/16* (2012.01)
*B60W 50/14* (2012.01)
*B60W 10/04* (2006.01)
*B60W 10/18* (2012.01)
(Continued)

(52) U.S. Cl.
CPC ............ *B60W 50/08* (2013.01); *B60W 10/04* (2013.01); *B60W 10/18* (2013.01); *B60W 10/20* (2013.01);
(Continued)

(58) Field of Classification Search
None
See application file for complete search history.

(56) References Cited

U.S. PATENT DOCUMENTS 9,420,958 B2 * 8/2016 Fung ...................... A61B 5/024
2014/0148988 A1   5/2014 Lathrop et al.
(Continued)

FOREIGN PATENT DOCUMENTS

DE   102009041187 A1   2/2011
DE   102010013243 A1   9/2011
(Continued)

OTHER PUBLICATIONS

English-language abstract of German Patent Application Publication No. 10 2013 010 928 A1, published Dec. 31, 2014; 2 pages.
(Continued)

*Primary Examiner* — Mussa A Shaawat
*Assistant Examiner* — Kyung J Kim
(74) *Attorney, Agent, or Firm* — Sterne, Kessler, Goldstein & Fox P.L.L.C.

(57) ABSTRACT

Method for operating a motor vehicle having at least one sensor for detecting a user state and/or at least one parameter from which the user state can be deduced, wherein a function and/or a device of the motor vehicle is automatically controlled by a control device, depending on a detected user state and/or a detected change in the user state, a level of autonomy which specifies to what extent a function and/or a device of the motor vehicle is controlled automatically by a control device of the motor vehicle or is manually controlled by a user, changes at least one function and/or at least one device of the motor vehicle and the function and/or the device is controlled according to the level of autonomy.

20 Claims, 1 Drawing Sheet

(51) Int. Cl.
  *B60W 10/20* (2006.01)
  *B60W 40/09* (2012.01)
  *B60W 40/08* (2012.01)
  *B60W 50/00* (2006.01)

(52) U.S. Cl.
  CPC .......... *B60W 40/09* (2013.01); *B60W 50/082* (2013.01); *B60W 50/14* (2013.01); *B60W 50/16* (2013.01); *B60W 2040/0827* (2013.01); *B60W 2040/0872* (2013.01); *B60W 2050/0089* (2013.01); *B60W 2050/143* (2013.01); *B60W 2050/146* (2013.01); *B60W 2540/04* (2013.01); *B60W 2540/22* (2013.01); *B60W 2540/26* (2013.01); *B60W 2540/28* (2013.01); *B60W 2540/30* (2013.01); *B60W 2550/00* (2013.01)

(56) References Cited

U.S. PATENT DOCUMENTS

| 2014/0244096 | A1 | 8/2014 | An et al. |
| 2014/0303899 | A1* | 10/2014 | Fung .................. B60R 25/25 702/19 |
| 2014/0371981 | A1 | 12/2014 | Nordbruch et al. |

FOREIGN PATENT DOCUMENTS

| DE | 102012213965 A1 | 2/2014 |
| DE | 102013010928 A1 | 12/2014 |
| EP | 2813408 A1 | 12/2014 |

OTHER PUBLICATIONS

English-language abstract of German Patent Application Publication No. 10 2009 041 187 A1, published Feb. 17, 2011; 2 pages.
English-language abstract of German Patent Application Publication No. 10 2010 013 243 A1, published Sep. 29, 2011; 1 page.
English-language abstract of German Patent Application Publication No. 10 2012 213 965 A1, published Feb. 13, 2014; 1 page.
International Search Report and Written Opinion of the International Searching Authority directed to related International Patent Application No. PCT/EP2016/000437, dated May 25, 2016, with attached English-language translation; 24 pages.
Written Opinion of the Authority in Charge of International Preliminary Examination directed to related International Patent Application No. PCT/EP2016/000437, dated Mar. 17, 2016, with attached English-language translation; 14 pages.

* cited by examiner

METHOD FOR OPERATING A MOTOR VEHICLE AND ASSOCIATED MOTOR VEHICLE

TECHNICAL FIELD

The invention relates to a method for operating a motor vehicle with at least one sensor for detecting a user state and/or at least one parameter from which the user state can be derived.

BACKGROUND

Modern motor vehicles have driver assistance systems which have a plurality of functions which make it possible to at least partially take over a driving task from the driver or the operation of a function or a device of the motor vehicle or to increase the comfort of the driver in other ways. The prior art also includes driver assistance systems which are designed to recognize a vital condition of a user, i.e., to detect, for example, whether the user of the motor vehicle is tired. According to the prior art, a warning or a recommendation for stopping to take a break can be given when an exhausted or tired driver is detected.

The disadvantage is that only a warning is issued and the driver is not supported in the context of the obtained information, for example, by it being adapted to the relevant vital state.

Furthermore, the driver assistance systems known in the prior art cannot consider whether a change of driver has occurred or whether the usual driver assistance systems cannot be adapted to an individual driver.

BRIEF DESCRIPTION OF THE DRAWINGS/FIGURES

DETAILED DESCRIPTION

Figure 1:
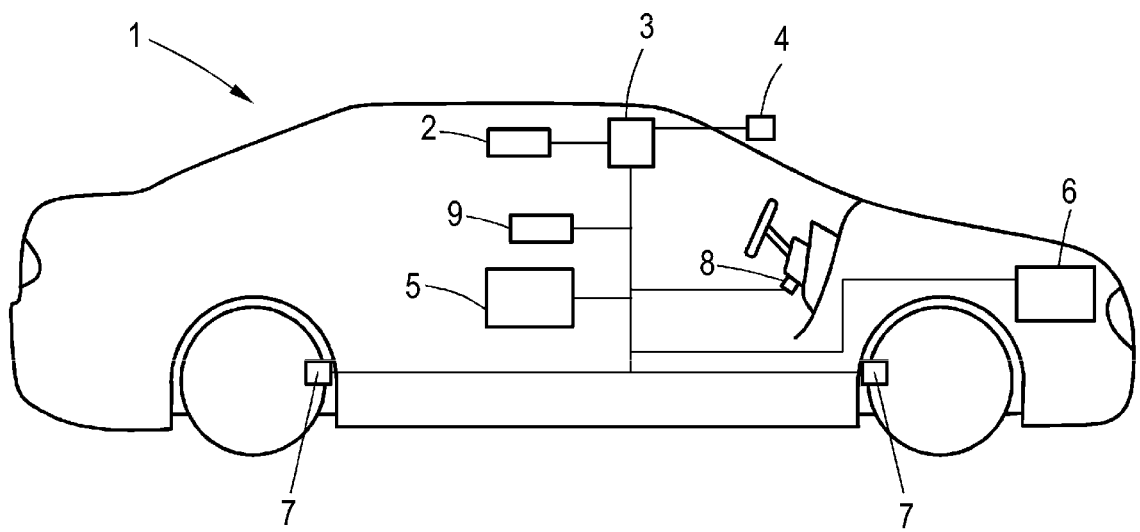
FIG. 1 illustrates a side view of a motor vehicle according to the invention.

The invention is therefore based on the object of specifying an improved method for operating a motor vehicle.

The object is achieved by a method of the type mentioned, in which, depending on a detected user state and/or on a detected change in the user state, a degree of autonomy is inventively provided which determines how much of a function and/or a device of the motor vehicle is automatically controlled by a control device of the motor vehicle or is manually controlled by a user, at least one function and/or at least one device of the motor vehicle being modified and the function and/or the device being controlled according to the level of autonomy.

The invention is based on the idea that at least one sensor detects a user state or a parameter from which the user state can be deduced and by means of this user state a level of autonomy determined for at least one function and/or a device of the motor vehicle. On the basis of this level of autonomy, the extent to which the function or the device of the motor vehicle is regulated autonomously, i.e. by a control device of the motor vehicle or manually by the user, is determined according to the invention. Advantageously, it is made possible upon a change in the user state, for the control device to be able to take over automatically at least one function or device at least partly or to return control thereof to the user. For example, in the case of a detected distraction of the user, e.g., by fatigue or a telephone conversation or a conversation with the occupants or infotainment applications, driving operation or any other function of the motor vehicle can be taken over by the control device at least partly autonomously.

The user is thereby supported and the distraction of the user is thus compensated without the user having to actively prompt this. In other words, the sensor detects whether a distraction of the user, or other user condition that makes a takeover by the control device suitable, is present, and if this is the case, a function or a device, particularly one affected by the distraction of the user, is taken over by the control device at least partly autonomously.

Of course, a sensor arrangement comprising a plurality of sensors can also be used instead of the at least one sensor.

Particularly preferably, the at least one function and/or the at least one device controls a longitudinal guidance and/or a transverse guidance of the motor vehicle. Accordingly, in a corresponding user state, the level of autonomy of a device which controls the longitudinal guidance and/or the transverse guidance of the motor vehicle and/or the device controlling the longitudinal guidance and/or the transverse guidance of the motor vehicle is increased, that is, the proportion of autonomous control is increased, such that the control device guides the motor vehicle longitudinally and/or transversely at least partly autonomously.

Advantageously, it can thus be prevented that, on account of the user state, for example a distraction of the user, the longitudinal and/or transverse guidance of the motor vehicle becomes impaired because of the insufficient attention of the user. The control device thus at least partly perceives the longitudinal guidance and/or the transverse guidance of the motor vehicle while the user is distracted or otherwise not fully able to control the motor vehicle. If the cause of the distraction is over, or the user state changes again, it is also possible for the level of autonomy of the relevant function and/or the relevant device of the motor vehicle to be further increased or decreased again so that the user once again manually controls the motor vehicle or the corresponding motor vehicle function and/or the corresponding device of the motor vehicle, or the control device takes over the control of the corresponding function and/or device completely autonomously.

A preferred embodiment of the method according to the invention can provide that at least one user profile is created, in which at least one user state is stored for at least one situation. Advantageously, which user status is present in which situation can thus be stored individually for at least one user. In this way, it is possible to react flexibly to an occurring situation, since the user profile can be used to determine which user status was present in the corresponding situation in the past. When the situation occurs, the level of autonomy of the corresponding function and/or device can thus be adapted according to the user profile. These may, for example, be certain roads which the individual user feels uncomfortable driving on or where he has reacted uncertainly. For example, weather conditions may also be mentioned, or driving situations which are less suitable for the individual user, for example, parking operations. If this is detected by means of the user status by the sensor, it is possible for the level of autonomy to be increased. For example, this can be detected in the case of a user who is uncomfortable in parking situations and the longitudinal and/or transverse guidance of the motor vehicle can accordingly be taken over fully autonomously by the control device so that the parking process takes place fully autonomously and the burden is thus taken off the user.

It is particularly preferred that when the at least one situation obtains, the level of autonomy is varied according to the stored user state.

A particularly preferred embodiment of the method according to the invention can provide that the situation describes a driving situation and/or the presence of a cause distracting the user from the driving situation. In addition, it is possible that when a cause distracting the user from the driving situation is present, the level of autonomy is increased. For example, this is the case when the user is distracted by receiving a message or by an incoming telephone call or by an infotainment application, so that the user's attention is not directed towards the driving situation but rather to the cause distracting him from the driving situation. In such a case, it is also possible to automatically increase the level of autonomy. An impairment of the function and/or the device for which the level of autonomy has been increased is thus reduced or avoided due to the cause which distracts the user.

Advantageously, at least one item of information concerning the surroundings of the motor vehicle can be detected additionally by means of the at least one and/or at least one further sensor. It is thus possible to obtain further information which enables a conclusion to be drawn on the necessity of changing the level of autonomy. For example, weather conditions and/or light conditions and/or objects in the surroundings of the motor vehicle may change the user state which can be detected. In these cases, the level of autonomy can be changed according to the change in the user state for each function and/or device of the motor vehicle.

A particularly preferred embodiment of the invention provides that the user state is determined by means of a pulse frequency and/or a color of a user's face and/or a blink frequency of the user and/or a steering behavior of the user and/or a driving behavior of the user. It should be noted here that, on the one hand, parameters can be detected which enable conclusions to be drawn which concern at least one vital function of the user, such as determining the pulse frequency and/or the facial color and/or the blink frequency of the user. It is, of course, also possible to detect all further parameters which enable a conclusion to be drawn regarding the vital functions of the user. Blood pressure would be a possibility here, for example. In addition, it is also possible to detect parameters which enable a conclusion to be drawn regarding the condition or the emotional state of the user. Examples here are the steering behavior of the user and/or or the driving behavior of the user. It can be determined whether the user has an aggressive way of driving or a relaxed way of driving, and the level of autonomy can be adjusted accordingly. It is therefore advantageous for the protection of the user and the surroundings that in the case of an aggressive way of driving arising from a corresponding emotional state, for the functions or the devices of the motor vehicle which act on the driving operation to be taken over at least partly autonomously by the control device or for a manual control by the user to be restricted.

The parameters describing a vital function of the user may additionally provide information about the constitution of the driver. On the basis of the pulse frequency and/or the facial color and/or the blink frequency, conclusions can thus be drawn about the fatigue or state of health of the user. Correspondingly, the level of autonomy of a function and/or of a device of the motor vehicle can be changed, for example, the driving operation of the motor vehicle can be performed autonomously by the control device when the user is overtired and the volume of a radio can be increased to keep the user awake. However, it is also possible to regulate the temperature in the interior of the motor vehicle so that the user does not fall asleep. If it is detected that the user has fallen asleep, the control of the motor vehicle, in particular the function and/or device relating to the longitudinal and/or transverse guidance of the motor vehicle, can be taken over autonomously by the control device.

Particularly preferably it is possible for the level of autonomy to be changed between an autonomous, partially autonomous and manual operation, in particular steplessly. The level of autonomy can thus be changed either in stages, at least manually, partially autonomously and autonomously. However, it is also possible to provide further stages or to change the level of autonomy steplessly. It is thereby possible to either restrict or release in a limited manner the individual functions or the support of the user, for example, in the transverse guidance and/or the longitudinal guidance of the motor vehicle, to a certain degree, or to leave it entirely up to the user or to control this completely autonomously. Of course, this can be applied to all devices or functions of the motor vehicle.

A preferred further development of the method according to the invention consists of the function and/or the device being restricted when the level of autonomy of a function and/or a device of the motor vehicle is increased. It is thus not only possible for the control device to take over the control of a function and/or a device of the motor vehicle, but it is also possible to leave the user able to control the corresponding function and/or device of the motor vehicle but to limit this.

For example, it is possible to restrict the longitudinal guidance if an aggressive state of the user has been detected, so that, for example, a maximum acceleration value can be defined which cannot be exceeded. This prevents the user from accelerating aggressively and endangering himself or his surroundings.

In addition, it can be particularly preferable to provide for the change in the level of autonomy to be reversed or reduced or prevented by user input. It is therefore possible that the automatic change in the level of autonomy is not wanted or accepted by a user, and said user reverses this by a user input. It is likewise possible, for example, to reduce a fully automatic takeover of a corresponding function and/or a device of the motor vehicle to a partly autonomous control. In addition, it is possible that an imminent increase in the level of autonomy, that is to say, a transfer of the control of a function and/or a device of the motor vehicle by the control device can be prevented or reduced.

It is particularly preferable that in the event of a change in the level of autonomy of at least one function and/or a device of the motor vehicle, a corresponding warning message is preferably output visually on a display device of the motor vehicle or output acoustically or haptically. This offers the advantage that the user is informed that the level of autonomy of at least one function and/or a device is changed. Preferably, the driver is thereby informed about the extent to which the level of autonomy is changed. The user can thus be informed, for example, that the longitudinal and/or transverse guidance of the motor vehicle is being taken over partly autonomously or autonomously. The user receives this information and can then, for example, concentrate fully on the cause which has distracted him from the driving operation.

In addition, the invention relates to a motor vehicle with at least one sensor for detecting a user state and/or at least one parameter from which the user state can be deduced. The control device is designed to change a level of autonomy which determines to what extent a function and/or a device of the motor vehicle is automatically controlled by the control device of the motor vehicle or manually by a user, and to control the function and/or the device corresponding to the level of autonomy. The motor vehicle according to the invention is thus designed to carry out the method according to the invention. Of course, all the details and features which have been mentioned for the method according to the invention can also be applied to the motor vehicle according to the invention.

Figure 2:
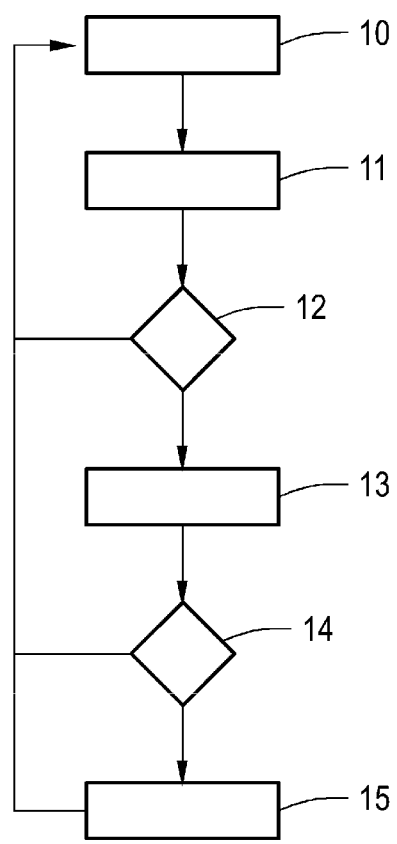
FIG. 2 illustrates a flow diagram with the essential steps of the method according to the invention.

The invention is illustrated below with the aid of exemplary embodiments and with reference to the drawings. The drawings are schematic illustrations and show:

FIG. 1 a side view of a motor vehicle according to the invention;

FIG. 2 a flow diagram with the essential steps of the method according to the invention.

FIG. 1 shows a motor vehicle 1 comprising a vital sensor arrangement 2, a behavior sensor arrangement 3 and an environmental sensor arrangement 4, which are arranged on board the motor vehicle 1. In this case, the vital sensor arrangement 2 is symbolically a plurality of sensors which detect a pulse, a blood pressure, a facial color and the blink frequency of a user of the motor vehicle 1. The behavior sensor arrangement 3 detects the driving behavior or the steering behavior of the user. The behavior sensor arrangement 3 detects, for example, longitudinal and transverse accelerations of the motor vehicle 1 as well as the steering and acceleration behavior of the user. In addition, parameters are also recorded via an internal monitoring system from which the behavior of the user can be inferred.

The environmental sensor arrangement 4 detects environmental influences, such as the light conditions, objects in the surroundings of the motor vehicle 1, weather conditions and the like. In addition, the invention relates to a motor vehicle with at least one sensor for detecting a user state and/or at least one parameter from which the user state can be deduced. The motor vehicle 1 also has a control device 5 which is designed to control the driving operation or the longitudinal and transverse guidance of the motor vehicle 1 by means of an intervention in a drive 6 and a braking device 7 and a steering device 8.

In addition, the motor vehicle 1 has a device 9 which symbolically represents further functions and devices of the motor vehicle 1. In this case, according to this exemplary embodiment, a multimedia device can be intended which is designed to receive and transmit messages and to present multimedia contents.

The method for operating the motor vehicle 1 is explained below with reference to the flow chart shown in FIG. 2.

The method begins in box 10 with starting the procedure. Accordingly, the vital signs, the behavior and the environmental parameters of the user of the motor vehicle 1 are detected in box 11 by means of the sensor arrangements 2, 3, 4. Next, in box 12, it is detected whether a user state or a change in the user state is present which necessitates a change of the level of autonomy. If this is not the case, box 12 is branched back to box 11 by continuing the detection of the parameters via the sensor arrangements 2 to 4.

If, however, a user state or a change in the user state which necessitates a change of the level of autonomy is detected in box 12, box 12 is branched to box 13, in which a check is made as to which function or which device of the motor vehicle 1 is affected by the user state or the changed user state. In addition, the extent to which the level of autonomy of each respective affected function or device of the motor vehicle 1 is to be changed is checked in box 13. It is, of course, possible for various functions or devices of the motor vehicle 1 to be changed in their level of autonomy in varying degrees. For example, the control device 5 can take over a driving operation if an inattentiveness of the user has been detected, doing so by increasing the level of autonomy for the drive device 6, the brake device 7 and the steering device 8, so that their control is completely autonomous. The device 9, which has no influence on the driving operation, is consequently not affected and consequently its level of autonomy is not increased. In this case, it may be necessary to change the level of autonomy of the steering device 8, the brake device 7 or the drive device 6 differently. This is also decided in box 13.

Next, in box 14, a check is made as to whether the user makes an operator input which should prevent, reduce or reverse a change of a level of autonomy. For this purpose, device 9 can indicate to the user that an increase in the level of autonomy for a function or device of the motor vehicle 1 is imminent or has taken place. If the user carries out such an input, box 14 will branch back to box 11, whereby the user state or a change in the user state is detected via the sensor arrangements 2 to 4. If this is not the case, the method in box 15 is continued by changing the level of autonomy and controlling the corresponding function and/or device of the motor vehicle 1 according to the change of the level of autonomy. This can be, in particular, a manual or partly autonomous or fully automatic control of the corresponding function and/or device of the motor vehicle 1.

After the change of the level of autonomy in box 15, the procedure also branches back to box 11, by determining by means of the sensor arrangements 2 to 4 whether a new change in the user state is present or a user state is present which requires a new change in the level of autonomy or a change in the level of autonomy for a further function and/or a device of the motor vehicle 1. If the driver has finished reading the message so that his attention again returns to the driving situation, box 12 detects that the change in the user state requires a change in the level of autonomy. Accordingly, it is determined in box 13 that the renewed increase in the user's attention to the driving situation affects the braking device 7, the steering device 8 and the drive device 6. If a user does not prevent this in box 14, the level of autonomy of the corresponding devices is reduced again in box 15 so that the user can control said level of autonomy again manually or partially autonomously.

In addition, it is possible to create at least one user profile in the control device 5 of the motor vehicle 1 in which at least one user state is stored for at least one situation. If the presence or the occurrence of such a situation is detected by one of the sensor arrangements 2, 3, 4 or any combination of at least two of the sensor arrangements 2, 3, 4, the level of autonomy for the affected function or the affected device of the motor vehicle 1 can be correspondingly adjusted according to the user profile. In particular, the user profile can be dynamically expanded by the method by storing an already traversed situation in the user profile together with the at least one parameter detected by the sensor arrangements 2, 3, 4. The method can thus be individually adapted to each user. The method is thus able to detect weaknesses of the user or situations in which a user does not feel comfortable or does not want to pass through manually when they occur and to take over the control of at least one affected function or device of the motor vehicle 1 autonomously or support the user of the motor vehicle 1 in a partially autonomous fashion. This offers the advantage to the user that he is supported at least partially autonomously, or in particular autonomously, in a situation that is uncomfortable for him. The comfort level of the user is thus increased.

The invention claimed is:

1. A method for operating a motor vehicle having at least one sensor for detecting a user state or at least one parameter from which the user state can be deduced, the method comprising:
creating a user profile that includes a plurality of user states, each of the plurality of user states having a corresponding level of autonomy,
wherein the level of autonomy determines an extent to which a function or device of the motor vehicle is automatically controlled by a control device or manually controlled by a user;
detecting the at least one parameter by the at least one sensor;
identifying the user state, from among the plurality of user states, based on the at least one parameter;
identifying the level of autonomy from the user profile based on the user state; and
controlling the function or device of the motor vehicle according to the level of autonomy.

2. The method of claim 1, wherein the function or device of the motor vehicle controls a longitudinal guidance or a transverse guidance of the motor vehicle.

3. The method of claim 1, further comprising:
adjusting the level of autonomy according to a second user state in the user profile.

4. The method of claim 1, wherein the user state describes a driving situation or a presence of a cause distracting the user from driving.

5. The method of claim 1, further comprising:
detecting at least one item of information concerning surroundings of the motor vehicle by means of the at least one sensor or by at least one further sensor.

6. The method of claim 5, further comprising:
adjusting the level of autonomy based on the at least one item of information concerning the surroundings of the motor vehicle.

7. The method of claim 1, wherein the user state is determined by means of a pulse frequency of the user, a face color of the user, a blink frequency of the user, a steering behavior of the user, or a driving behavior of the user.

8. The method of claim 1, wherein the level of autonomy is changed between an autonomous, partially autonomous, and manual operation.

9. The method of claim 1, wherein manual operation of the function or device of the motor vehicle is limited when the level of autonomy of the function or device of the motor vehicle is increased.

10. The method of claim 1, wherein a change in the level of autonomy is reversed, reduced, or prevented by user input.

11. The method of claim 1, further comprising:
outputting, in the event of a change in the level of autonomy, a corresponding warning message visually on a display device of the motor vehicle or acoustically or haptically.

12. A motor vehicle comprising:
at least one sensor for detecting a user state or at least one parameter from which the user state can be deduced,
wherein the motor vehicle is configured to:
create a user profile that includes a plurality of user states, each of the plurality of user states having a corresponding level of autonomy,
wherein the level of autonomy determines an extent to which a function or device of the motor vehicle is automatically controlled by a control device or manually controlled by a user;
detect the at least one parameter by the at least one sensor;
identify the user state, from among the plurality of user states, based on the at least one parameter;
identify the level of autonomy from the user profile based on the user state; and
control the function or device of the motor vehicle according to the level of autonomy.

13. The motor vehicle of claim 12, wherein the function or device of the motor vehicle controls a longitudinal guidance or a transverse guidance of the motor vehicle.

14. The motor vehicle of claim 12, wherein the motor vehicle is further configured to adjust the level of autonomy according to a second user state in the user profile.

15. The motor vehicle of claim 12, wherein the user state describes a driving situation or a presence of a cause distracting the user from driving.

16. The motor vehicle of claim 12, wherein the motor vehicle is further configured to detect at least one item of information concerning surroundings of the motor vehicle by means of the at least one sensor or by at least one further sensor.

17. The motor vehicle of claim 16, wherein the motor vehicle is further configured to adjust the level of autonomy based on the at least one item of information concerning the surroundings of the motor vehicle.

18. The motor vehicle of claim 12, wherein the user state is determined by means of a pulse frequency of the user, a face color of the user, a blink frequency of the user, a steering behavior of the user, or a driving behavior of the user.

19. The motor vehicle of claim 12, wherein the level of autonomy is changed between an autonomous, partially autonomous, and manual operation.

20. The motor vehicle of claim 12, wherein manual operation of the function or the device of the motor vehicle is limited when the level of autonomy of the function or the device of the motor vehicle is increased.

* * * * *